(12) United States Patent
Iaccarino (10) Patent No.: US 9,020,759 B2
(45) Date of Patent: Apr. 28, 2015

(54) TECHNIQUE FOR SCREEN-BASED ROUTE MANIPULATION

(75) Inventor: Silvio Iaccarino, Erlangen (DE)

(73) Assignee: Elektrobit Automotive GmbH, Erlangen (DE)

( * ) Notice: Subject to any disclaimer, the term of this patent is extended or adjusted under 35 U.S.C. 154(b) by 264 days.

(21) Appl. No.: 13/213,671

(22) Filed: Aug. 19, 2011

(65) Prior Publication Data

US 2012/0053836 A1 Mar. 1, 2012

(30) Foreign Application Priority Data

Aug. 25, 2010 (DE) .......................... 10 2010 035 373

(51) Int. Cl.
| | | |
|---|---|---|
| G01C 21/36 | (2006.01) | |
| G01C 21/34 | (2006.01) | |
| G06F 3/041 | (2006.01) | |
| G06F 3/0485 | (2013.01) | |

(52) U.S. Cl.
CPC .......... *G01C 21/3664* (2013.01); *G06F 3/0485* (2013.01); *G06F 3/0416* (2013.01); *G01C 21/3461* (2013.01); *G01C 21/3676* (2013.01)

(58) Field of Classification Search
None
See application file for complete search history.

(56) References Cited

U.S. PATENT DOCUMENTS

| | | | | |
|---|---|---|---|---|
| 6,006,161 | A * | 12/1999 | Katou | 701/410 |
| 6,026,346 | A * | 2/2000 | Ohashi et al. | 701/416 |
| 7,840,347 | B2 * | 11/2010 | Noguchi | 701/418 |
| 8,331,991 | B2 * | 12/2012 | Kim et al. | 455/566 |
| 8,468,469 | B1 * | 6/2013 | Mendis et al. | 715/863 |
| 2004/0056837 | A1 * | 3/2004 | Koga et al. | 345/156 |
| 2007/0162224 | A1 * | 7/2007 | Luo | 701/210 |
| 2008/0027637 | A1 * | 1/2008 | Sakano | 701/209 |
| 2008/0202823 | A1 * | 8/2008 | Won et al. | 178/18.01 |
| 2008/0320419 | A1 * | 12/2008 | Matas et al. | 715/863 |
| 2009/0322700 | A1 * | 12/2009 | D'Souza et al. | 345/174 |
| 2010/0076671 | A1 * | 3/2010 | Pryakhin et al. | 701/119 |
| 2010/0114470 | A1 | 5/2010 | Nambata | |
| 2010/0302281 | A1 * | 12/2010 | Kim | 345/661 |
| 2010/0312466 | A1 * | 12/2010 | Katzer et al. | 701/201 |
| 2010/0324817 | A1 * | 12/2010 | Hansen et al. | 701/210 |
| 2011/0029185 | A1 * | 2/2011 | Aoki et al. | 701/29 |
| 2011/0115822 | A1 * | 5/2011 | Bae | 345/661 |
| 2011/0128248 | A1 * | 6/2011 | Nakata et al. | 345/173 |

(Continued)

FOREIGN PATENT DOCUMENTS

| | | |
|---|---|---|
| DE | 10-2007-035580 A1 | 2/2008 |
| JP | 11-037782 A | 2/1999 |

(Continued)

OTHER PUBLICATIONS

Machine translation WO 2009/145024.*

(Continued)

*Primary Examiner* — Fadey Jabr
*Assistant Examiner* — Kevin P Mahne
(74) *Attorney, Agent, or Firm* — Westerman, Hattori, Daniels & Adrian, LLP (57) ABSTRACT

A technique for manipulating precalculated routes on a screen is described. One aspect of the method comprises the steps of detecting a selected screen position (P) and a time period (t) of a selection operation at the screen position (P), modifying weights of the road segments in dependence on the detected screen position (P) and the time period (t), and calculating a route, manipulated in relation to the precalculated route, on the basis of the modified weights.

18 Claims, 3 Drawing Sheets

(56) References Cited

U.S. PATENT DOCUMENTS

| | | | |
|---|---|---|---|
| 2011/0154390 A1* | 6/2011 | Smith | 725/32 |
| 2011/0169731 A1* | 7/2011 | Takenaka et al. | 345/157 |
| 2011/0224896 A1* | 9/2011 | Napieraj | 701/200 |
| 2012/0306763 A1* | 12/2012 | Lu et al. | 345/169 |
| 2013/0139094 A1* | 5/2013 | Lu | 715/773 |
| 2013/0212541 A1* | 8/2013 | Dolenc et al. | 715/863 |

FOREIGN PATENT DOCUMENTS

| | | |
|---|---|---|
| JP | 2007-003328 A | 1/2007 |
| WO | WO 2009/145024 * | 12/2009 |

OTHER PUBLICATIONS

Machine translation WO 2009/145024. Translated Mar. 20, 2013.*

* cited by examiner

TECHNIQUE FOR SCREEN-BASED ROUTE MANIPULATION

TECHNICAL FIELD

The present disclosure relates generally to the manipulation of routes in the context of route planning or route guidance. In particular, the invention relates to a technique for manipulating a route on a screen.

BACKGROUND

By inputting a starting point and destination point, a navigation device or route planner determines a "reasonable route" between the input starting point and destination point. Normally, the route with the shortest travelling time or the shortest travelling distance is meant by "reasonable route".

The calculated route is determined as a graph from nodes and edges, wherein in general road intersections or junctions correspond to the nodes and road segments between adjacent road intersections or junctions correspond to the edges. Hereby, road segments may be characterised by additional parameters, such as the length, road type, speed limit, etc. With the aid of these parameters, weights are calculated for the road segments and the route is then calculated on the basis of these weights. Such weights may, however, also be already firmly allocated to the road segments in the cartographic data.

When planning a route, there is often a need to manipulate a precalculated route subsequently. For example, places in the vicinity of the precalculated route may be of interest to a user for making an intermediate stop. However, it is also conceivable that a user prefers less busy roads along the route to those roads (e.g. motorways) preset by the navigation device or route planner. In this case, the planning may become tedious since individual intermediate destination points have to be input.

A simplification of the route planning is achieved (cf. Google maps) by making the route displayed on the screen graphically editable with the aid of a cursor. In this case, with the aid of the cursor an appropriate point on the precalculated route is marked and dragged to another position on the map. The route is then appropriately adapted to the new position of the point. A disadvantage of this method is that the cursor has to be made to coincide with the displayed route on the screen in order to be able to carry out a modification.

SUMMARY

It is the object to provide a method and an apparatus which simplify a manipulation of precalculated routes.

For this purpose, a method for manipulating a route on a screen is provided, the route being precalculated by means of cartographic data, wherein the cartographic data comprise road segments, to which weights for route calculation are assignable, the method comprising the following steps: detecting a selected screen position and a time period of a selection operation at the screen position; modifying weights of the road segments in dependence on the detected screen position and the time period; and calculating a route, manipulated in relation to the precalculated route, on the basis of the modified weights.

The modification of the weights of the road segments may be dependent on a distance of the road segments to the selected screen position. According to one embodiment, the road segments are increasingly "penalised" with increasing distance to the screen position. "Penalised" in this context means that the modified weights of the road segments have values which are unfavourable for calculating the route and therefore are not considered at the expense of other road segments. Thus, road segments in the immediate vicinity of the screen position are preferred to those at a greater distance when calculating the manipulated route.

The strength of the modification of the weights may increase with the distance to the selected screen position. If a calculation of a route is carried out on the basis of the lowest weights of road segments, the weights are modified such that the value of the modified weights increases with increasing distance. The distance-dependent increase of the modified values of the weights is equivalent to a penalisation of the road segments. For this purpose, the originally calculated or assigned weights of the road segments are multiplied or added by a distance-dependent parameter. The distance-dependent strength of the modification of the weights may increase with the distance according to an exponential law or in another functional relationship.

The modification of the weights of road segments may additionally depend on a distance of the road segments to a destination point of the precalculated route. The modification of weights carried out in dependence on the detected screen position and time period is hereby, for instance, for all those road segments weakened or corrected which have a small distance to the destination point. The degree of weakening or correction may increase with decreasing distance. In this way, it is ensured that manipulated routes are not led away from a destination point.

The strength of the route manipulation may further dependent on the distance of the screen position to a starting point or the destination point. For instance, the modification of the weights and thus the manipulation of the route may decrease with decreasing distance of the screen position P to the starting point or destination point.

Furthermore, the strength of the modification of the weights and thus the strength of the route manipulation may be determined by the time period of the selection operation. The strength of the modification may be directly proportional to the time period. In an alternative embodiment, the strength of the modification may increase with the time period exponentially or in another functional relationship. For the modification of the weights an offset value may be set via the time period. In this case, the modifying weights may be decreased in relation to the original weights by an offset value. According to one embodiment (and in dependence on the route algorithm used), the modified weights may also assume negative values.

The time- and/or distance-dependently modified weights of the route segments may be limited by a preset lower and/or upper threshold value in such a way that each modified route segment still remains usable for the route calculation. In this case, the preset threshold values are dependent on the route algorithm used.

Additionally or alternatively to the strength of the modification, a cartographic region in the vicinity of the selected screen position may be defined via the time period within which the weights of road segments are modified. In this way, the modification is restricted to all those road segments which lie within the cartographic region. The extent of the cartographic region may, for example, be directly proportional to the time period of the selection operation. The longer the selection operation lasts, the larger becomes the cartographic region within which road segments of a map, or sections thereof, visualised on the screen are modified. The extent of the cartographic region may hereby be limited to the map displayed on the screen.

According to one implementation, those road segments are preferred for the calculation of the manipulated route, to which the lowest weights are assigned. In this case, the originally calculated or assigned weights of the road segments within the cartographic region may be modified in dependence on the time period in such a way that they have a lower value in relation to the original weights. In this way, a precalculated route from a starting point to a destination point may be manipulated through the time period such that it leads from the starting point via the cartographic region surrounding the screen position to the destination point. The selected screen position presets the direction, and the time period presets the strength of the deviation of the manipulated route from the precalculated route. A precalculated route can thereby be graphically manipulated in a simple manner.

According to a further implementation, the selected screen position may be included in the route as an intermediate destination point when the manipulated route has reached the selected screen position. Furthermore, other screen positions may be manually selected in order to carry out further manipulations of the route or add further intermediate points to the manipulated route.

In conjunction with the screen position, a corridor may be selected on the screen by manually marking a continuous screen region between a screen position A and a screen position B. In this case, the strength of the route manipulation may be preset by the time period of the marking at the screen position B. The manipulated route is then calculated in relation to the selected corridor on the screen.

The manipulated route, additional information on the manipulated route, the selected screen position and/or the extent of the cartographic region may be displayed on the screen. In this case, the additional information may comprise, for example, distances, place names, etc. The development of the manipulated route may be displayed in real time. Furthermore, it is also conceivable for the selected screen position and the modification strength within the cartographic region to be displayed on the screen by colour contrasts. In this way, a user may check the development of the route manipulation and appropriately control his or her selection process on the screen.

According to a further implementation, by the selection operation at the screen position the map displayed on the screen may be simultaneously scaled with and in dependence on the route manipulation. In this case, the scaling of the displayed map follows the manipulated route which increasingly approaches the screen position with increasing time period. In this way, for instance, the map may be enlarged in the vicinity of the screen position and displayed in more and more detail, so that the user is better able to control the manipulation of the route in the vicinity of the screen position. This applies particularly when the initially displayed map with the precalculated route has a small scaling in which only the most important roads, such as motorways, and larger towns are displayed. In a first instance by selecting a screen position, the user is hereby able to roughly preset the direction for the manipulation of the precalculated route, and, subsequently, with the aid of enlarged map sections, to set individual roads for the manipulated route which were not originally displayed. The setting of one or more roads on the enlarged map sections may be carried out optionally by selecting further screen positions.

For displaying the routes and selecting the screen position, a touch-sensitive screen may be used. In this way, a selection operation for manipulating the precalculated route may be carried out by touching the screen. Alternatively, a selection operation may also be carried out by means of a mouse, a joystick or other input means.

Furthermore, a computer program product with program code is provided for carrying out the method when the computer program product is executed on a computer device (e.g. a navigation device). For this purpose, the computer program product may be stored on a computer-readable recording medium (e.g. a memory card or a read-only memory).

In addition, an apparatus for manipulating a route on a screen is provided, the route being precalculated by means of cartographic data, wherein the cartographic data comprise road segments, to which weights for route calculation are assignable, the apparatus comprising: a device which is configured to detect a selected screen position and a time period of a selection operation at the screen position; a device for modifying weights of the road segments in dependence on the detected screen position and the time period of the selection operation; and a device for calculating a route, manipulated in relation to the precalculated route, on the basis of the modified weights.

According to one implementation, the apparatus may further comprise a data memory for storing the cartographic data and a screen for displaying the manipulated route, the selected screen position and/or a cartographic region. Furthermore, the screen may be a touch-sensitive screen.

In addition, a navigation device is provided which comprises the apparatus for manipulating a precalculated route on a screen.

BRIEF DESCRIPTION OF THE DRAWINGS

Further details, aspects and advantages of the present disclosure described herein will become apparent from the following drawings, in which.

DETAILED DESCRIPTION

Figure 1:
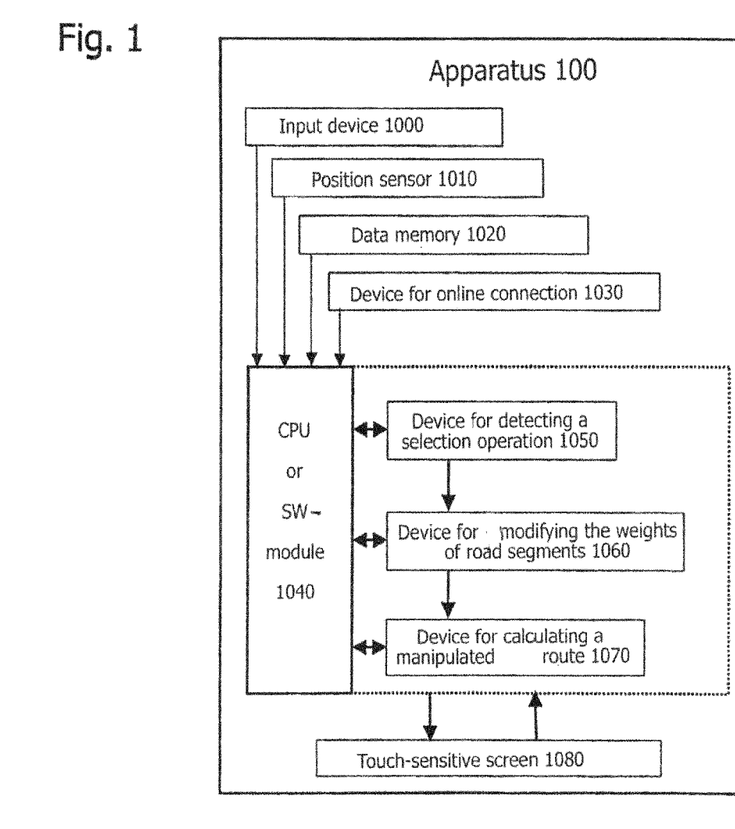
FIG. 1 shows an apparatus according to an exemplary embodiment of the present invention.

FIG. 1 shows, in the form of a block diagram, an exemplary embodiment of an apparatus 100 for manipulating a route on a screen that is precalculated by means of cartographic data. The apparatus may be part of a navigation device, a mobile telephone, a smart phone or a Personal Digital Assistant (PDA). The apparatus 100 may also be fixedly installed in a vehicle or designed as a portable unit (Personal Navigation Device, PND).

The apparatus 100 comprises an input device 1000, a position sensor 1010, a data memory 1020, a device for setting up an online connection 1030 and a touch-sensitive screen 1080. The apparatus 100 further comprises a core functionality 1040 in the form of a central processing unit (CPU) or a microprocessor or in the form of a software module (SW module), a device 1050 for detecting a selection option, a device 1060 for modifying the weights of road segments and a device 1070 for calculating a manipulated route. The devices 1050, 1060 and 1070 may be designed as stand-alone devices or, alternatively, to this be integrated in the core functionality 1040 as a sub-unit, as indicated in FIG. 1 by the dotted line course.

The input device 1000, the position sensor 1010, the data memory 1020, the device for setting up an online connection 1030 and the touch-sensitive screen 1080 are in communicating connection with the core functionality 1040.

The input device 1000 is designed to provide inputs about a starting point, a destination point, intermediate stops, other relevant route instructions and/or parameters (e.g. presetting of road types, etc.) to the core functionality 1040. The inputting of route-relevant data may be performed by pressing input keys and/or acoustically, such as for example by communicating place names, road names, etc. Furthermore, the core functionality 1040 obtains via the position sensor 1010 (e.g. a GPS sensor) up-to-date position information, which may also define the starting point.

Cartographic data, on the basis of which a route between a starting point and destination point is calculated, are stored in the data memory 1020, e.g. in a database. If necessary, the cartographic data comprise, information on the length, the speed limit, the road type, building operations, etc. of road segments and/or predefined weights of the road segments, which are evaluated when calculating a route.

Additionally (or, as appropriate, alternatively) to the data memory 1020, the apparatus 100 comprises a device 1030 for setting up an online connection (e.g. GPRS connection) in order to obtain cartographic data from a central server for the calculation of a route. The advantage of using online data is that data with updated characteristics on road segments and road intersections are included in the calculation of the route. Furthermore, calculated or manipulated routes may be made available online via the online connection.

The touch-sensitive screen 1080 is designed to provide selected cartographic data visually to a user. Besides this output function, the touch-sensitive screen 1080 additionally has an input function. According to the present exemplary embodiment, by touching the screen 1080 a screen position (P) can be selected, by means of which a precalculated route is manipulated. Furthermore, the touch-sensitive screen 1080 may be provided for selecting icons, for navigation in menus or submenus, for selecting place names, road names and route parameters. The touch-sensitive screen 1080 may thus constitute an input medium in addition to the input device 1000.

The device 1050 for detecting a selection operation is designed to detect the screen position (P) and a time period (t) of touching the screen. The determined values are then supplied to the device 1060 for modifying the weights of road segments. According to one embodiment, the device 1050 compares the detected time period (t) with a time threshold value (T) in order to evaluate whether a selection operation for manipulating a route is present or not. The time threshold value (T) specifies a minimum time period, thereby preventing a situation where accidental touching of the touch-sensitive screen 1080 results in unintentional modification of the precalculated route.

The device 1060 for modifying the weights is configured to modify the weights of road segments on the basis of the determined parameters of screen position (P) and time period (t). It is further designed to select a cartographic region surrounding the selected screen position (P), in dependence on the detected screen position (P) and time period (t). The device 1060 modifies all those road segments on a map or parts thereof which lie within the spatial cartographic region.

Finally, the device 1070 for calculating a manipulated route is configured to calculate a new route, in relation to the precalculated route, between the starting point and the destination point on the basis of the weights modified by means of the device 1060.

Figure 2:
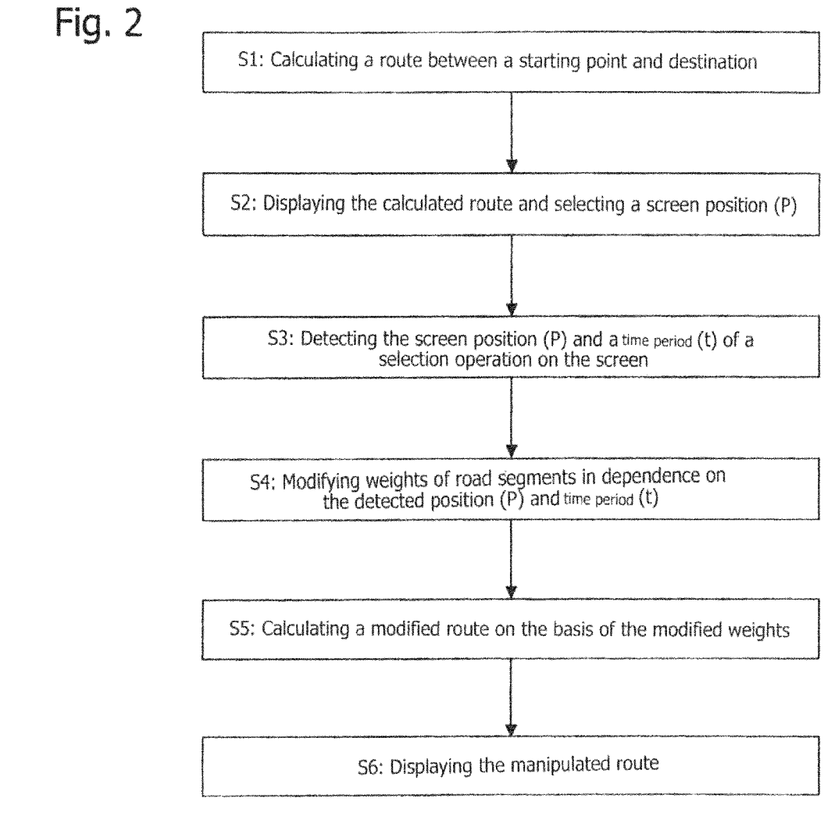
FIG. 2 shows a schematic representation of a method according to an exemplary embodiment of the present invention.

In the following, an exemplary embodiment of a method for manipulating a route, precalculated by means of cartographic data, on a screen will now be described in more detail with reference to the flow chart shown in FIG. 2. The method is explained with the aid of the apparatus 100 shown in FIG. 1.

In a first step S1, a route is calculated on the basis of an input starting point and destination point. The starting point may be determined, for example, by the position sensor 1010. Hereby, the calculation of the route may be carried out using generally known route algorithms (e.g. Dijkstra's algorithm, A* algorithm, other heuristic algorithms) and will therefore not be explained further in what follows. For the calculation of the route, in a first step (which may be also performed offline, if appropriate) road segments are weighted, wherein the weight of a segment is dependent on parameters, such as segment length, road type to which the segment belongs, the speed limit when traversing the segment, further road conditions of the segment, etc. The detailed characteristics of the weights corresponding to the road segments, such as the limiting of the values by an upper and lower threshold value, the assumption of negative values, etc., depends on the details of the route algorithm used and does not influence the present exemplary embodiment. When calculating the route, in the present exemplary embodiment road segments with less weight are preferred to those with greater weight. The calculation or consideration of the weights of road segments may be further influenced here by inputting route criteria. For example, a route may be calculated according to the criterion of the shortest travelling distance or the shortest travelling time.

In a second step S2, the precalculated route between the starting point and destination point is displayed by means of the screen 1080. In principle, the precalculated route is fully displayed on the screen 1080. Sections of the route may be further selected by conventional zooming on the screen 1080. By touching the touch-sensitive screen 1080, a user selects a screen position (P), in relation to which the weights of the road segments of the map displayed on the screen 1080 can be modified.

In a following step S3, the selected screen position (P) and the time period (t) of touching the screen 1080 is detected. Hereby, the time period (t) may be detected continuously during the touching process in order to enable a route manipulation in real time. When selecting a screen position (P), for instance, by means of a finger, a region with a certain extent is generally marked rather than an exact screen position (P), wherein the extent may depend on the size of the finger. According to one embodiment, a focal point is determined from the marked region and identified as screen position (P), on the basis of which the modification of the weights of the road segments is then performed.

In a step S4, the weights of the road segments are distance-dependently and time-dependently modified in dependence on the detected parameters of screen position (P) and time period (t). The time period (t) substantially determines the strength of the modification of the weights and thus the strength of the route manipulation. Furthermore, a size of the cartographic region may be set via the time period (t). It is provided to restrict the modification to all those road segments which lie within the cartographic region. By means of the screen position (P), a distance ($d_1$) to the segments to be modified is determined. The weights of the road segments are changed depending on the determined distance ($d_1$). Thus, the determination of the screen position (P) with respect to the precalculated route serves to manipulate the route in the direction to the selected screen position (P). A detailed description of this is given below with reference to FIG. 3.

In step S5, the precalculated route is subsequently recalculated on the basis of the modified weights. In the calculation, those road segments with the least weight are preferred. Hereby, the calculation occurs in real time on the basis of the continuously detected time period (t). In the subsequent step S6, the manipulated route is displayed on the touch-sensitive screen 1080 for the user. The displaying of the manipulated route may likewise take place in real time.

Figures 3, 3A:
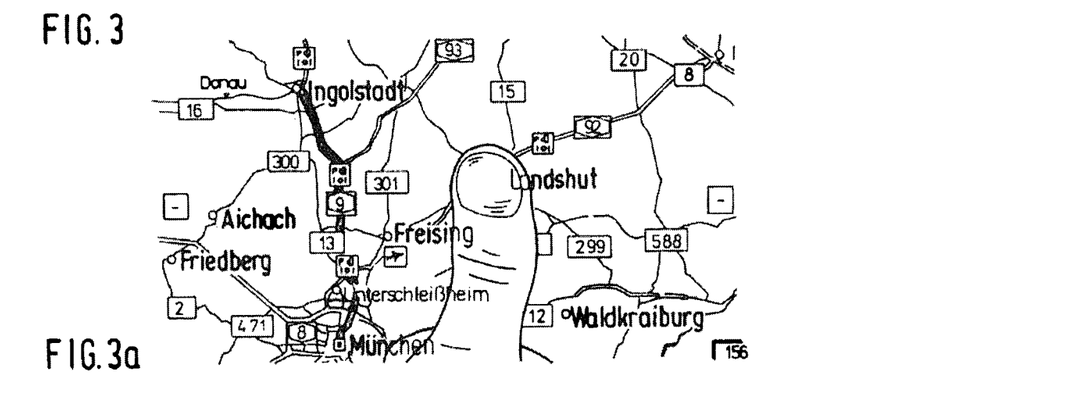
FIG. 3 shows a representation of a sequence of route manipulations according to the present method.

With reference to FIG. 3, the development of the route manipulation on the screen 1080 in dependence on the parameters of screen position (P) and time period (t) is shown. FIG. 3a firstly shows a precalculated route between the cities of Munich and Ingolstadt. Hereby, the precalculated route represents a route with the shortest travelling time.

The screen position (P) is selected on the touch-sensitive screen 1080 by touching with a finger. As can be seen from FIG. 3b, in the present exemplary embodiment a screen position (P) corresponding to the cartographic location of Landshut is selected. Hereby, it should be mentioned that the technique presented herein does not depend on the assignment of a selected screen position (P) to a cartographic location. It is primarily the distances ($d_1$) of the road segments to the screen position (P) that are important for the route manipulation. Hereby, the weights of the road segments are modified distance-dependently such that the amounts of the modified weights increase, starting from the screen position (P), with increasing distance outwards. The distance-dependent increase of the modified weights is equivalent to an increasing "penalisation" of the road segments, i.e. road segments are with increasing distance to the screen position (P) are considered less in the route calculation. The distance-dependent increase of the weights or the distance-dependent change of the weights may obey an exponential law.

Figure 3B:
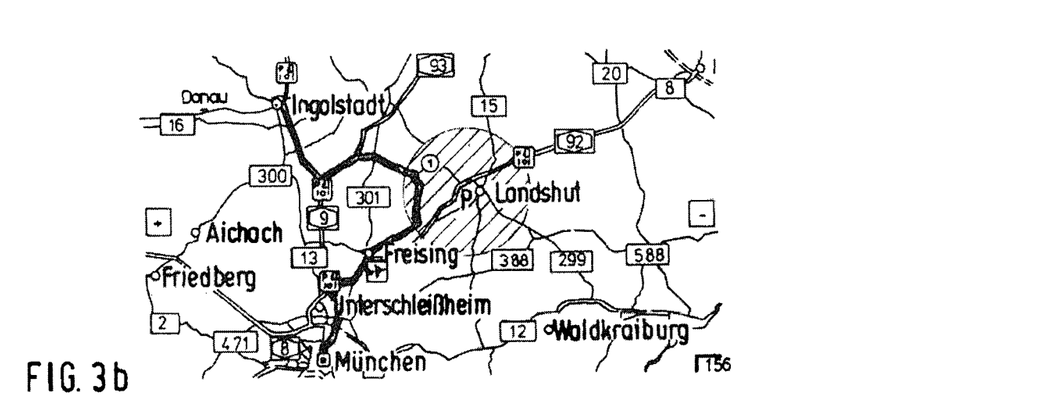

In addition to the distance-dependent modification, a strength (absolute value) of the modification of the weights is determined by the time period (t), wherein the strength of the modification increases directly proportional to the increase of the time period (t). The time period (t) can thus be used to set an offset value or a multiplication factor for the modification, in relation to which the modified weights are reduced relative to the originally calculated or assigned weights. Hereby, the modified weights may also assume negative values. Through the distance- and time-dependent modification a radially symmetric "potential well" for the weights develops, wherein the centre of the potential well is predetermined by the screen position (P).

Further, the time period (t) is used to set the cartographic region around the selected screen position (P) within which the above-described potential well develops further. In other words, the modification of the weights remains restricted to the cartographic region around the selected screen position (P). Starting from the screen position (P), with increasing time period (t) the cartographic region extends further and further, like a spherical wave. Hereby, the extent is proportional to the time period (t). Simultaneously, the strength of the modification increases with the time period (t). Thus, a continuously increasing cartographic region, in which the amplitude of the potential well increases, develops with increasing time period (t). In this way, with increasing time period (t), more and more road segments in the vicinity of the precalculated route or of the route itself are caught and modified by the potential well.

Figure 3C:
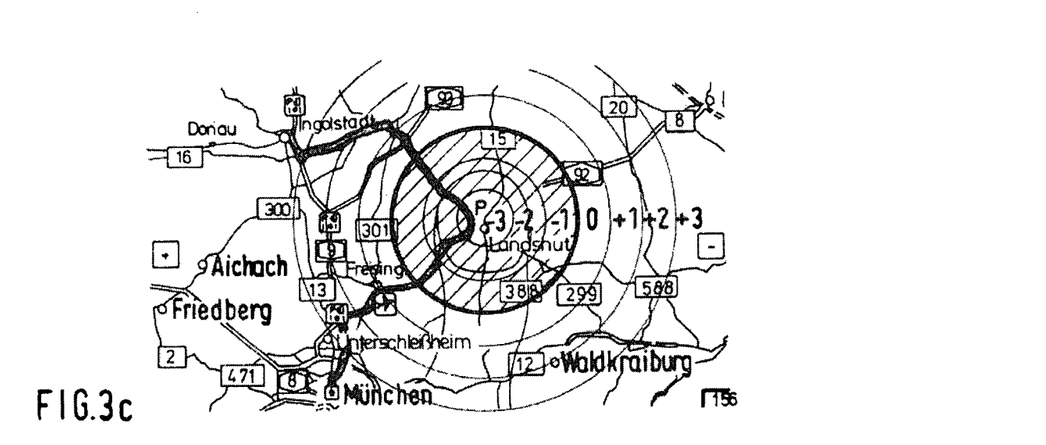

In FIGS. 3b and 3c, the development of the potential well with increasing time period (t) and also the influence of the potential well on the development of the route manipulation are shown. In FIG. 3b, only that part of the cartographic region is shaded grey within which the value of the modified weights is reduced in relation to the original weights. In FIG. 3c, the entire cartographic region is shown within which weights are modified, wherein that region in which the weights are reduced is shaded grey once again. The concentric circles mark equipotential areas in the image of the potential trough. The values indicated each symbolise the strength of the modification of the road segments within an equipotential area, the negative values corresponding to a reduction and the positive values to an increase of the original weights.

It should be pointed out that the values indicated in FIG. 3c for the modification of the weights and also the concentrically shown equipotential areas serve only to explain the present exemplary embodiment and the exemplary embodiment is not restricted thereto. For example, the transition in the cartographic region from a region with negative values to a region with positive values may be arbitrarily shifted by an offset value. Furthermore, the strength and distance dependence of the modification of the weights may be adapted to the route algorithm used.

FIG. 3b shows the manipulation of the precalculated route from Munich to Ingolstadt after a first time period ($t_1$). Hereby, the weights of all road segments within a cartographic region proportional to the time period ($t_1$) are modified. The weights of road segments in the vicinity of the screen position (P) are reduced (region shaded grey), whereas road segments in the vicinity of the route and on sections of the route are (greatly) increased (penalised) in dependence on the distance from the screen position (P). As a result, the precalculated "direct" route between Munich and Ingolstadt no longer constitutes a favourable route, since the sum of the weights of this route is now higher than that of a route which is locally diverted in the direction of Landshut. By further touching the screen position (P), the time period (t) and the potential well increase further. FIG. 3c shows the route manipulation after a second time period ($t_2$). In comparison with FIG. 3b, the cartographic region around the screen position (P), and with it the region in which the value of the modified weights is reduced, increases. Furthermore, the strength of the modification of the weights in the cartographic region increases. As a result, the determined route is drawn increasingly in the direction of the selected screen position (P). In other words, the precalculated route is attracted increasingly by the potential well. In FIG. 3c the manipulated route from Munich to Ingolstadt now goes via Landshut.

By selection of the screen position (P) and the time period (t), it is thus possible to manipulate any desired precalculated route or parts thereof in a simple and intuitive way without having to mark or otherwise manipulate points on the precalculated route in the process. The screen position (P) relative to the precalculated route determines the direction of the route manipulation, the time period (t) the strength of the route manipulation.

The real-time display of the manipulation process on the touch-sensitive screen 1080 enables the user to recognise the influence of the time period (t) and to control his or her touching accordingly. Of course, the invention described herein is not restricted to a touch-sensitive screen. The selection of a screen position may also be carried out with the aid of a mouse, a joystick or other input means.

The invention claimed is:

1. A method for manipulating a route on a screen, the route being pre-calculated between a starting point and a destination point by means of cartographic data, wherein the cartographic data comprise road segments, to which weights for route calculation are assignable, the method being performed in a route calculation apparatus of a navigation device, the apparatus being designed to perform the following steps:

detecting, by the navigation device, a selected screen position and a time period of a selection operation at the screen position;

modifying, by the navigation device, weights of road segments in dependence on the detected screen position and the time period, wherein weights of the road segments are modified in a functional relationship to their screen distances to the selected screen position; and calculating, by the navigation device, a route between the starting point and the destination point, the route being manipulated in relation to the pre-calculated route, on the basis of the modified weights, wherein the time period represents a duration of the selection operation, and wherein the time period determines a strength of the modification of the weights, wherein the strength of the modification increases with the time period exponentially or in another functional relationship.

2. The method according to claim 1, wherein the strength of the modification of the weights increases with the distance of the road segments to the selected screen position.

3. The method according to claim 1, wherein the modification of the weights is limited by at least one preset threshold value.

4. The method according to claim 1, wherein the modification of the weights additionally depends on a distance of the road segments to a destination point position of the pre-calculated route.

5. The method according to claim 1, wherein the size of a cartographic region in the vicinity of the selected screen position within which the weights of road segments are modified is set by the time period.

6. The method according to claim 5, wherein the extent of the cartographic region increases with the time period.

7. The method according to claim 5, wherein the extent of the cartographic region is limited to a map section displayed on the screen.

8. The method according to claim 5, wherein the modified weights within the cartographic region have a lower value in relation to the originally calculated weights.

9. The method according to claim 1, wherein those road segments which have the lowest values in relation to their weights are preferred when calculating the manipulated route.

10. The method according to claim 1, further comprising displaying on the screen the manipulated route, the selected screen position or the cartographic region surrounding the screen position.

11. The method according to claim 10, wherein the manipulated route is determined and displayed in real time.

12. The method according to claim 1, further comprising scaling the cartographic data displayed on the screen in dependence on the calculated manipulated route.

13. The method according to claim 1, wherein the screen is a touch-sensitive screen and the selection of the screen position is carried out by touching the screen.

14. A non-transitory computer-readable recording medium to store a method for manipulating a route on a screen, the route being pre-calculated between a starting point and a destination point by means of cartographic data, wherein the cartographic data comprise road segments, to which weights for route calculation are assignable, the method being performed in a computer, the computer being designed to perform the following steps:

detecting a selected screen position and a time period of a selection operation at the screen position;

modifying weights of road segments in dependence on the detected screen position and the time period, wherein weights of the road segments are modified in a functional relationship to their screen distances to the selected screen position; and calculating a route between the starting point and the destination point, the route being manipulated in relation to the pre-calculated route, on the basis of the modified weights, wherein the time period represents a duration of the selection operation, and wherein the time period determines a strength of the modification of the weights, wherein the strength of the modification increases with the time period exponentially or in another functional relationship.

15. An apparatus for manipulating a route on a screen, the route being pre-calculated between a starting point and a destination point by means of cartographic data, wherein the cartographic data comprise road segments, to which weights for route calculation are assignable, comprising:

a device which is configured to detect a selected screen position and a time period of a selection operation at the screen position;

a device for modifying weights of road segments in dependence on the detected screen position and the time period, wherein weights of the road segments are modified in a functional relationship to their screen distances to the selected screen position; and a device for calculating a route between the starting point and the destination point, the route being manipulated in relation to the pre-calculated route, on the basis of the modified weights, wherein the time period represents a duration of the selection operation, and wherein the time period determines a strength of the modification of the weights, wherein the strength of the modification increases with the time period exponentially or in another functional relationship.

16. The apparatus according to claim 15, further comprising:

a data memory for storing the cartographic data; and a screen for displaying the manipulated route, the selected screen position or a cartographic region.

17. The apparatus according to claim 16, wherein the screen is a touch-sensitive screen.

18. A navigation device, comprising an apparatus for manipulating a route on a screen, the route being pre-calculated between a starting point and a destination point by means of cartographic data, wherein the cartographic data comprise road segments, to which weights for route calculation are assignable, comprising:

a device which is configured to detect a selected screen position and a time period of a selection operation at the screen position;

a device for modifying weights of road segments in dependence on the detected screen position and the time period, wherein weights of the road segments are modified in a functional relationship to their screen distances to the selected screen position; and a device for calculating a route between the starting point and the destination point, the route being manipulated in relation to the pre-calculated route, on the basis of the modified weights, wherein the time period represents a duration of the selection operation, and wherein the time period determines a strength of the modification of the weights, wherein the strength of the modification increases with the time period exponentially or in another functional relationship.

* * * * *